UNITED STATES PATENT OFFICE

BORIS N. LOUGOVOY, OF MONTCLAIR, NEW JERSEY, ASSIGNOR TO ELLIS-FOSTER COMPANY, OF MONTCLAIR, NEW JERSEY, A CORPORATION OF NEW JERSEY

CELLULOSIC COATING COMPOSITION

No Drawing. Application filed December 4, 1925. Serial No. 73,265.

This invention relates to a coating composition containing compounds of cellulose, e. g., cellulose ethers or their esters, such as cellulose nitrate or acetate, which are soluble in certain organic solvents, and relates specifically to those containing nitrocellulose or pyroxylin; the preferred embodiment having present a substantial or influential proportion of low-viscosity nitrocellulose, carried in a vehicle comprising one or more solvents for this substance, and a non-solvent component or super-diluent comprising olefin hydrocarbons, with or without monochloro benzol and the like.

This application is a continuation in part of my co-pending application Serial No. 69,502.

The low viscosity nitrocellulose or soluble cotton preferably utilized in accordance with the present invention, and by means of which surprising results are obtained, employing said super-diluent, may be made in various ways, e. g., by adding a minute amount of ammonia to a solution of nitrocellulose of higher viscosity, whereupon, on standing, reduction in viscosity occurs to a substantial degree. Note my co-pending application Serial No. 691,505.

The low-viscosity nitrocellulose also may be made by carrying out the nitration of linters or paper at a higher temperature than when making ordinary high-viscosity soluble cotton. A soluble cotton of high viscosity also may be converted into one of low viscosity by heating for an hour or two at a temperature between 100 and 125° C. Alpha cellulose produced from wood pulp, (e. g., sulphite pulp, or similar paper stock) may be nitrated at said relatively higher temperature to produce low-viscosity nitrocellulose, or after nitrating at a lower temperature, the product may be heat-treated to convert it into the class of low-viscosity cellulose esters. Thus it becomes possible to make nitrocotton, or nitrowood fibre of very low viscosity, such as is expressed by the term "one-half second cotton", or low viscosities in this general neighborhood, which enable compositions to be made in accordance with my invention, having advantageous flowing and spraying qualities.

In nitrocellulose coating compositions there is usually required an effective solvent which evaporates relatively slowly and serves as a water-eliminant preventing blushing. Among such solvents are butyl, amyl, and hexyl alcohols, their acetates and other esters, diacetone alcohol, mesityl alcohol and mesityl oxide, phorone, ethyl lactate and diethyl carbonate. Along with these may be used more volatile solvents, e. g., methyl or ethyl acetate, acetone, methyl acetone, ethyl alcohol, ethyl ether, propyl ether, methyl alcohol and methyl acetone, ethyl formate and propionate, propyl and isopropyl alcohol and their esters. By using nitrocotton which is of low viscosity and is soluble in alcohol, a mixture of ethyl alcohol and ethyl acetate, preferably anhydrous, sometimes may be used without the addition of the heavier solvents.

Since the foregoing solvents, especially the heavier ones, normally required for water elimination, are relatively very expensive, a cheaper material which may be used as a diluent and which may be classed as a non-solvent, is frequently required. In the present invention it is an object to use a non-solvent of such good diluting, i. e., extending properties, that it may be classed as a super-diluent.

Among non-solvents, toluol and xylol (solvent naphtha) are now generally employed. A very substantial proportion of these solvents may be added to the nitrocellulose solution without precipitation of the latter. These solvents have a lesser degree of volatility than benzol and are therefore in such demand that they are becoming more costly. Benzol, however, may be employed in some cases.

Petroleum distillates possess a rather bad reputation in this field. Ordinarily they cannot be added to the same extent as aromatic hydrocarbons without coagulation of the nitrocellulose, or precipitation of resins, or other substances, which may be present. The object of a diluent, as indicated above, is to enable a lesser proportion of the expensive nitrocellulose solvents to be used, but petroleum distillate is an addition which has been found precarious for this purpose. Thus a lacquer may be made containing ordinary saturated petroleum hydrocarbons of a volatile character, which lacquer is clear when first made, but on standing, and oftentimes after shipment, coagulation of the nitrocellulose may take place rendering the composition worthless for the intended purpose. Since this may not happen until a period of several months may have elapsed, with changed weather conditions, or some disturbances creating the precipitation, the employment of saturated petroleum hydrocarbons in an effectively cheapening proportion is hazardous.

In accordance with the preferred form of my invention olefin hydrocarbons are employed as the diluent, or extending non-solvent, or as a component of such non-solvent. These may be obtained cheaply from cracked petroleum, and the latter may be distilled in such a manner as to concentrate the olefin fraction. At the same time, it is desirable to include cyclic paraffins, naphthenes and appropriate aromatic hydrocarbons, which may have formed during the cracking operation. I may carry out the cracking with pressure stills, or may use tube cracking, with or without pressure. At ordinary atmospheric pressure, the tube cracking affords a maximum of olefins. At the same time some acetylene of bad odor, or very highly unsaturated resinifying bodies result, which I prefer to remove by suitable refining operations. In fact, I prefer to employ a hydrocarbon solvent whose unsaturated components of the olefin type are mainly mono-olefins, rather than diolefins. The latter, especially the conjugated diolefins tend to resinify, yielding resins which are not always nicely compatible with nitrocellulose, and, for that reason the preferred form of the invention contemplates their elimination.

Another advantage in the employment of such olefin hydrocarbons is that, compared with saturated petroleum hydrocarbons of about the same boiling point range, the former, mix better with the nitrocellulose composition, enabling a larger proportion of diluent to be used, and since such cracked material is cheap, a saving in the expensive nitrocellulose solvents results.

In some cases, also solvents containing a few per cent of water, which do not mix so readily with saturated petroleum distillates, can be incorporated to better advantage with the olefin containing mixture. Alcohol, which does not mix readily with saturated petroleum distillate, can be incorporated to advantage in the mixture of olefins and cycloparaffins obtained by cracking petroleum.

The advantages accruing under this invention increase in proportion to the olefin and cyclic products obtained by cracking, and I therefore may operate a cracking process, such as a tube cracking system, to obtain a predetermined proportion of these super-diluents. It is within the range of the present invention to employ a super-diluent containing a proportion of olefins and cyclic bodies, proportioned with respect to the requirements of the intended composition.

It is also feasible in accordance with my invention to employ the unsaturated distillate obtained by air-blowing heated heavy oil at a pressure of say, 300 to 500 lbs., whereby an oxidized and unsaturated distillate is obtained possessing valuable qualities of miscibility and serving as a super-diluent. Thus, I may employ a fraction distilling over a wide range, say, for example, up to 200° C., of any of the foregoing olefin-containing distillates. Another range is that from 75° C., to 160° C. A closer boiling distillate is that taken between 100° C., and 150° C. A limited boiling range effective for certain lacquers is that distilling between about 130° C., and 160° C.

In general, I prefer to use from five per cent and upwards of the desired olefins, and the proportion may increase up to forty per cent of olefins, or even higher, in aforesaid super-diluent. A product high in olefins and similar unsaturates may be admixed with casinghead naphtha or with benzol, toluol, solvent naphtha, and the like, as may be desired, provided the essential effective quality of the super-diluent is not lost.

A valuable extending agent is formed by mixing monochloro benzol with petroleum hydrocarbons, especially those containing olefins, using proportions ranging from, say, ten per cent of the chlorinated solvent and upwards, to compositions containing a major proportion of the chlorbenzol. Mixtures of the latter with olefin-containing hydrocarbons and with casinghead naphtha, or other saturated petroleum distillate may be employed in some cases as the non-solvent.

In making up a lacquer composition which is not to contain any pigment that renders it opaque, I prefer to introduce some substance which tends to absorb ultra-violet rays, and thereby prevent penetration of such rays deeply into the exposed film. Among such substances which I may employ are dimethyl aniline, diethyl aniline and homologues, certain sulphur-containing and sulphonated compounds, and the like. Ordinarily, only two to five per cent of such ultra-violet absorbers are required.

The petroleum distillate employed in some cases may be passed through a zone exposed to ultra-violet radiation, with or without contact with air or oxygen as such exposure to ultra-violet rays tends to increase the extending power of the super-diluent, that is; a greater proportion may be added to the lacquer composition with consequent saving of the expensive solvents.

In making lacquer enamels, pigments of various kinds are employed, and these are ground in a ball mill, or other suitable grinding device, with the solution of nitrocellulose, with or without resins, and other modifying substances. The employment of a super-diluent during the grinding operation is considered advantageous by me. Grinding pigments under such conditions of dispersion assists in obtaining a smooth flowing lacquer, which may be used for brushing purposes to advantage. It may be settled or centrifuged after grinding, when lacquer enamels having the highest degree of pigment fineness are desired.

In preparing the lacquer or lacquer enamel for spraying purposes, in accordance with the present invention, I may use a super-diluent having a boiling point range which is different from that employed in the case of a brushing lacquer. The initial boiling point of the super-diluent may be lower when spraying the composition than when applying with a brush. The presence of very low boiling super-diluent components in the case of the brushing lacquer, tends to cause brush marks. Preferably, therefore, for brushing lacquers, I employ a super-diluent beginning to boil slightly above 100° C., or higher.

Monochlor benzol boiling around 135° C., admixed with an equal volume of cracked distillate boiling between 130–150° C., makes an excellent super-diluent.

Higher boiling fractions of petroleum, e. g., 130–200° C., may be used with monochloro toluol in like manner. In place of the latter monochloro benzol or mixtures of the chloro benzol and chloro toluol may be used.

On the other hand when not so powerful an extending agent is adequate, I may prepare what for purposes of this invention may be called a toluol substitute by using a mixture of say, 1 volume of monochloro benzol to three to nine volumes of the petroleum distillate.

Using such super-diluents with aforesaid low-viscosity nitrocellulose gives rise to new and unexpected results. The low-viscosity nitro cotton solutions may be diluted, in some cases, by this super-diluent, to an extraordinary degree, almost indicative of some actual solvent effect conferred by the super-diluent. It would appear that the super-diluent forms with low-viscosity nitrocellulose, what, in terms of chemistry, might be designated a hydrocarbonsol.

To the foregoing, I ascribe the clarity and high gloss of films and coating made in accordance with the present invention and since high gloss or lustre is a desideratum in many cases, and is somewhat lacking in ordinary lacquer enamels, I am able to make glossy coatings cheaply and without addition of a high proportion of soft and perishable resins. The super-diluent thus has a surprising cooperative effect quite apart from mere dilution.

In compositions made in accordance with the present invention, various softeners, e. g., castor oil, blown rapeseed oil, diethyl phthalate, tricresyl phosphate, acetin, and the like, also natural, artificial or synthetic resins, such as dammar, copal, rosin ester, rosin phthalic glyceride resin, castor oil phthalic glyceride resin, nitrated castor oil, and so forth, may be introduced to obtain different degrees of flexibility, adhesion, hardness and total-solid content.

*Example 1*

For some purposes low concentrations of nitrocellulose are desired, e. g., in cheap lacquers giving very thin coatings on metal or other surfaces.

The following will illustrate one composition of a simple character prepared without resins, softeners, or other additions, any or all of which may be introduced as may be desired.

The following proportions are all by weight:

(A) Low-viscosity nitro cotton (one-half second soluble cotton) 1 part, butyl acetate 5 parts.

(B) Petroleum distillate (boiling between 100–160° C.) 1 part, monochloro benzol 1 part.

Take 60 parts of (A) and add (B) gradually with stirring. It will be found that approximately 200 parts of (B) can be added before a permanent cloudiness appears.

Under the same conditions I have not been able to introduce more than 100 parts of toluol without observing permanent cloudiness.

Thus, toluol, always considered so effective a diluent, is far less powerful than the super-diluent of the present invention, of which the foregoing is an illustration of the preferred form.

Moreover, the surprising observation has been made by me that the diluent power of a mixture of petroleum distillate and chloro benzol is greater than the numerical average of the individual powers of each component.

Example 2

| | Parts |
|---|---|
| One-half second soluble cotton | 1 |
| Castor oil phthalic glyceride resin | 1 |
| Diacetone alcohol | 5 |
| Petroleum distillate | 5 |
| Monochlorobenzol | 2 |

This composition contains 58 per cent by weight of the super-diluent. It has the advantage of being free from the banana oil odor of amyl and butyl acetate. Painters object to the odor of "banana liquid" and favor a product having the odor of turpentine or mineral spirits. This prejudice is very strong in some quarters and acts as a drawback to the introduction of new products containing various strongly-smelling ester bodies and the like. The composition represented by Example 2 has an agreeable odor, more closely approximating the expectations of the painter than is the case with many of the compositions now on the market.

Example 3

| | Parts |
|---|---|
| One-half second soluble cotton | 5 |
| Rosin ester | 5 |
| Butyl acetate | 30 |
| Petroleum distillate (boiling from 130–150° C.) | 30 |
| Dimethylaniline | ½ |
| Softening agent | 2½ |

The softening agent in this case consists of equal parts of castor oil and tricresylphosphate. The petroleum fraction of this example contains olefins, and it will be noted that the proportion of the non-solvent or diluent to the total vehicle is 50 per cent.

Example 4

| | Parts |
|---|---|
| Low-viscosity nitrocotton | 2 |
| Benzoic phthalic glyceride resin | 2 |
| Ethyl lactate | 5 |
| Butanol | 1 |
| Monochlorbenzol | 10 |
| Light petroleum distillate | 4 |

Of the total vehicle, 70 per cent is of the non-solvent type. This is surprising, especially in view of the fact that the resin employed is soluble with difficulty in hydrocarbons.

Example 5

| | Parts |
|---|---|
| Low-viscosity nitrocellulose | 4 |
| Rosin ester | 4 |
| Butyl acetate | 12 |
| Petroleum distillate | 20 |
| Monochlorobenzol | 8 |
| Castor oil | 1 |
| Tricresylphosphate | 1 | uent constitutes 69 per cent of the total vehicle exclusive of the softening agents.

While the invention is directed especially to the employment of nitrocellulose of the low-viscosity type, by which results of a surprising character are obtained in accordance with the present invention, I include, in the broader phase of the invention, ordinary soluble cotton and nitrocellulose of high-viscosity, including celluloid and smokeless powder residues. Employing my super-diluent, such substances of high-viscosity become more tractable and their uses in the coating arts is therefore expanded. Also, as stated at the beginning of this specification I may make use of other cellulose esters or the ethers of cellulose, in some cases. Irrespective of the cellulose compound employed I make use of a positive solvent for such nitrocellulose and a diluent component containing petroleum distillate of an appropriate character and a chlorinated aromatic hydrocarbon of the benzol type.

What I claim is:—

1. A coating composition comprising nitrocellulose, a positive solvent therefor, and a diluent component containing cracked petroleum distillate and monochlorobenzol.

2. A coating composition comprising nitrocellulose, a positive solvent therefor, and a diluent component containing a light distillate from cracked petroleum and a volatile chlorinated hydrocarbon of the benzol type.

3. In a coating composition containing nitrocellulose, a diluent-component comprising a cracked petroleum distillate boiling between 130 and 150° C. and monochlorobenzol.

BORIS N. LOUGOVOY.